No. 823,420. PATENTED JUNE 12, 1906.
C. W. LEVALLEY.
CHAIN.
APPLICATION FILED FEB. 16, 1905.
2 SHEETS—SHEET 1.
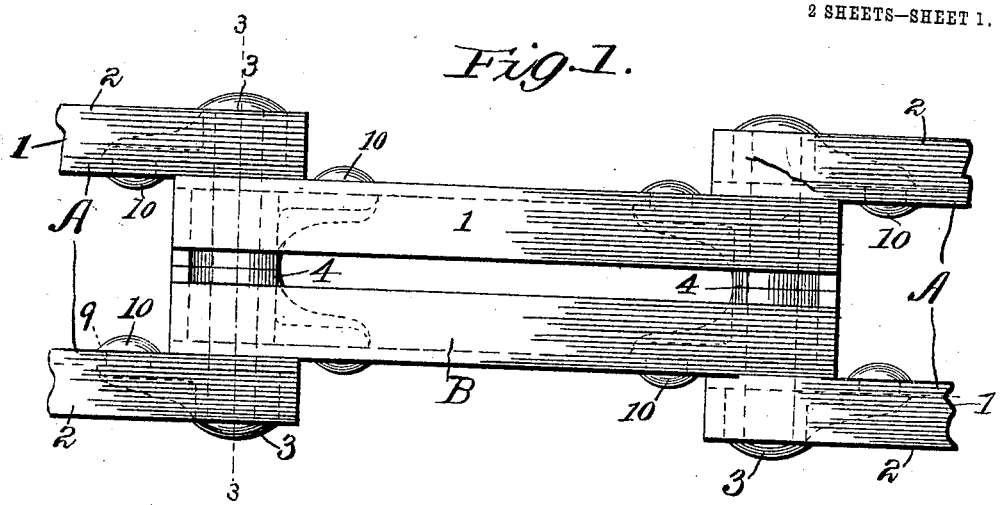
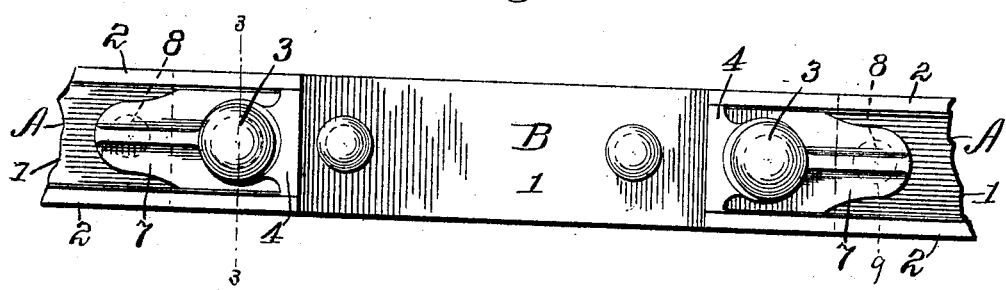
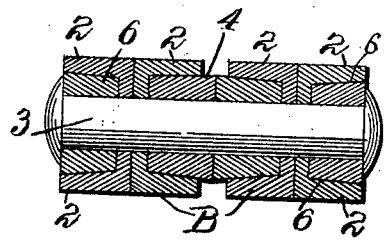 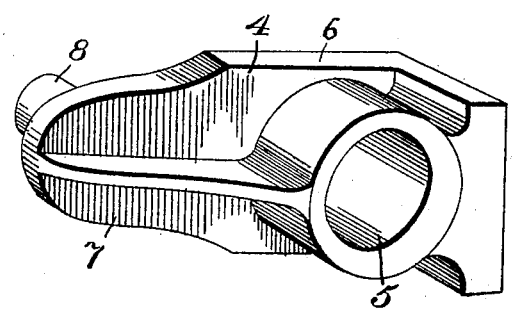
Witnesses
Wm F Hoyle
H. N. Low
Inventor
Christopher W. Levalley
By J. S. Barker
Attorney

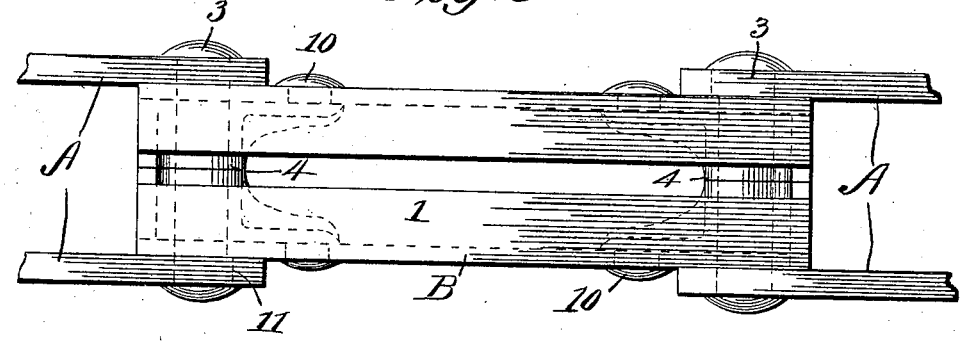
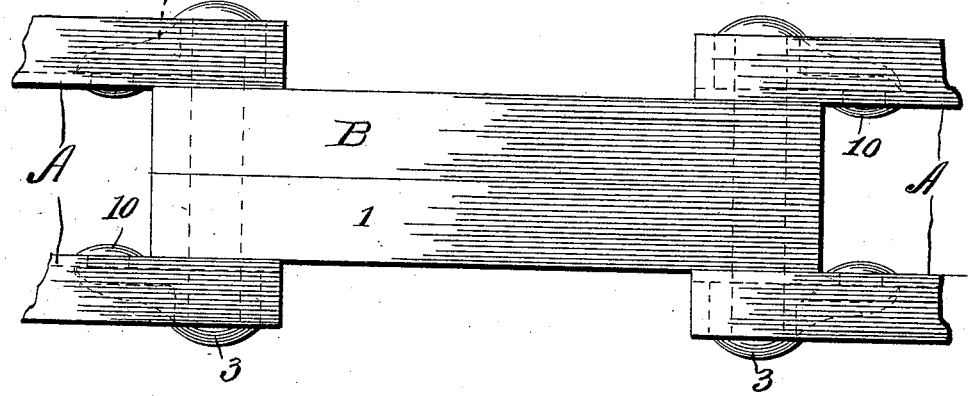
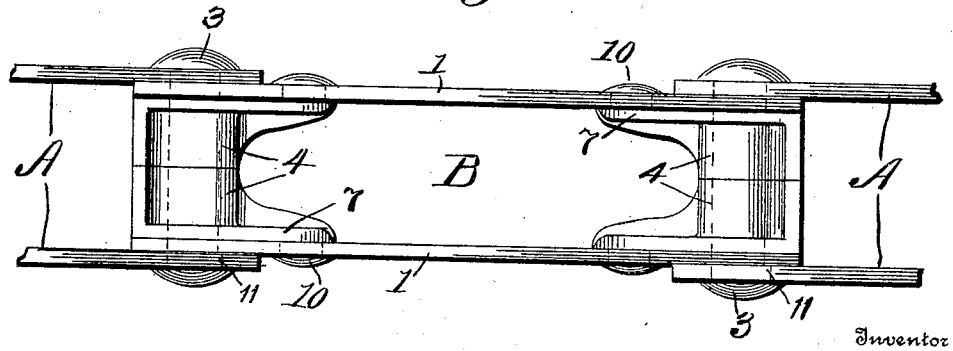

UNITED STATES PATENT OFFICE.

CHRISTOPHER W. LEVALLEY, OF MILWAUKEE, WISCONSIN.

CHAIN.

No. 823,420.　　Specification of Letters Patent.　　Patented June 12, 1906.

Application filed February 16, 1905. Serial No. 245,864.

*To all whom it may concern:*

Be it known that I, CHRISTOPHER W. LE-VALLEY, a citizen of the United States, residing at Milwaukee, in the county of Milwaukee and State of Wisconsin, have invented a new and useful Chain, of which the following is a specification.

My invention relates to chains employed for conveyer purposes and as traction or drive chains; and it has for its object to produce a chain of such construction that structural steel, such as flat steel bars or channel-bars, may be used for the links thereof, thus providing for a chain of great strength at relatively low price, also to provide relatively long and large bearings for the pintles that serve to connect the links of such chain, to produce a chain having wearing-shoes on both sides or faces thereof, and to provide other improvements in chains of this character which will hereinafter be pointed out.

In the accompanying drawings I have illustrated my invention as applied to several forms of a drag-chain.

Figure 1 is a top plan view of a double-shoe steel drag-chain embodying my improvements. Fig. 2 is a side view of the same. Fig. 3 is a cross-sectional view taken on the line 3 3 of Figs. 1 and 2. Fig. 4 is a perspective view of one of the separate pintle-bearing pieces or blocks that is constructed and adapted to be attached to one of the side bars of the chain. Figs. 5, 6, and 7 are plan views of chains of somewhat different constructions from those shown in the other views, illustrating other forms of my invention.

Each link of the chain has two side bars formed of bar metal, preferably of structural steel cut to lengths for any particular size or type of chain to be produced. Various forms of structural steel may be used for this purpose. Thus in Fig. 7 there is shown a form of chain in which the links are formed of plain flat steel bars, while in Figs. 1, 2, and 3 is shown a form of chain the links of which are formed of channel-bars of steel. The latter chain for some purposes is superior to that shown in the other views, as the flanges 2 2 constitute wearing-shoes for the chain, and by using material of this construction I am enabled to produce a chain having shoes on both sides, which is often of advantage, as where a chain is employed for conveyer purposes and has an upper and lower horizontal run. I prefer to construct the chain as represented in Fig. 1—that is, of alternate open and closed links, (designated, respectively, A and B,) the former being adapted to receive the teeth of the sprocket-wheels in connection with which the chain is used and the latter being arranged intermediate the open links A. Each link is formed of a pair of side bars 1 1, and the links are connected by pintles 3. The pintles may be of any suitable construction; but I prefer to employ a plain headed bolt, which after being inserted in place has one end upset or headed in a way now quite common in the art of making chains. When the links of the chain are formed of channel-bars, as indicated in Figs. 1, 2, and 3, the channels of the open links A face outward, while the channels of the intermediate links face inward and the adjacent ends of the links overlap in the usual way. It will be understood that the side bars of the links are perforated near their ends for the passage of the connecting-pintles 3.

In order to provide elongated bearings for the pintles or cross-bolts, so as to prevent undue wear of the apertures through the side bars through which such bolts pass, I have invented a novel form of separate pintle-bearing, which is illustrated in detail in Fig. 4 and which is arranged to be attached to and combined with the side bars of the links. Such bearing-piece consists of a piece or block of metal 4, adapted to be secured to the face of the side bar and perforated at 5 for the passage of the connecting-pintle. When such bearing is to be used in combination with a side bar of channel shape, as indicated in Figs. 1, 2, and 3, I prefer that its opposite faces 6 should be beveled to fit the correspondingly-beveled inner faces of the flanges 2 of side bars, as this insures a very close fit between the bearing-pieces and the side bars when the chain is assembled and the pintles or cross-bolts are riveted. I prefer that the hole 5 through the block should be arranged somewhat eccentrically in order to throw the greatest amount of metal on that side of the axis of the aperture which is to receive the greatest amount of wear. A separate bearing-piece such as described may be secured in place in various ways; but I prefer to form the block 4 with a laterally-extending plate or bracket 7 from which extends a stud or lug 8. This bracket is adapted to lie flat against the face of the side bar of the links, and the stud 8 thereof passes through the aperture 9 in the side bar. The end of the lug is preferably dished or made concave, so as to facilitate the end of the lug that may project through the aperture 9 and beyond the face of the side bar being spread or upset to form a head 10, that operates to securely hold the bearing-piece in place. In a form of chain like that shown in Fig. 1 there are four of these bearing-pieces at each joint or articulation of the chain. Two of them are arranged between the outward-extending flanges 2 of the open link A and the other two are arranged between the inward-extending flanges of the intermediate link B. It will be understood that the apertures 5 in the bearing-blocks register with the apertures in the side bars through which the connecting-pintles pass.

I prefer that the bearing-pieces that are secured to the intermediate links should be of such length as to serve as spacing members by coming into engagement face to face, thereby holding the side bars of such links at a suitable distance apart. It is not important that the bearing-pieces secured to the open links should be of the same size as those carried by the intermediate links. In Fig. 1 I have represented them as being somewhat shorter, so that they do not project beyond the flanges of the outer links, while the bearing-blocks of the intermediate links do extend beyond the flanges of the side bars thereof. I prefer that these bearing blocks or pieces should extend out flush with the ends of the side bars to which they are secured. This is of practical advantage in the construction of the intermediate links B, as such pieces then constitute filling blocks or pieces arranged between the side bars and adapted to engage with the teeth of the sprocket-wheels over which the chain passes.

In Fig. 7 I have shown my invention applied to a chain, the side bars of which are formed of flat steel bars instead of being constructed of channel-bars. In such a form of chain I may dispense with the separate bearings for the open links and use them only in connection with the intermediate links. When thus arranged, the connecting bolts or pintles are preferably provided with keys 11, arranged to fit corresponding key-seats in the side bars of the open links in order to prevent the pintles from rotating in their seats in such side bars, and thus cutting them out with undesirable rapidity, the wear being thus confined to the elongated bearings in the separate blocks or pieces 4.

In the form of my invention shown in Fig. 6 I represent a chain, the side bars of the open link of which are formed of channel-shaped steel, while the intermediate links B are each of a single piece of solid metal. In this form of the invention the bearing-pieces will be combined only with the open links.

In Fig. 5 I have illustrated another form of the invention, in which the open links are formed of plain steel bars and the intermediate links B are formed of channel-bars.

Each of the different forms of chain which I have illustrated has advantages incident to its peculiar construction, which need not, however, be set forth in detail, and each, as will be readily seen, embodies one or more features of my present invention.

Having described my invention, what I claim, and desire to secure by Letters Patent, is—

1. In a chain, the combination of the links having overlapping side bars perforated near their ends, connecting-pintles arranged to pass through the perforations in the side bars, and a pair of bearing-pieces for each joint of the chain, such pieces being separate from the side bars, having elongated bearings for the pintles arranged to register with the perforations in the side bars and to extend beyond the faces of the side bars to which they are secured, and also having means for attachment to the side bars extending beyond the overlapping end of the side bars, substantially as set forth.

2. In a chain, the combination of the open links having opposite side bars, separate bearing-pieces secured to the outer faces of the side bars, and having bearings alining with the pintle-apertures in the side bars and extending outward beyond the faces of the side bars, and the connecting-pintles arranged to be seated in apertures in the said bearing-pieces and side bars, substantially as set forth.

3. In a chain, the combination of a series of open links, a series of intermediate links having separate side bars, the pintles for uniting the links of the chain, and the separate bearing-pieces secured to the inner faces of the side bars of the intermediate links, the said bearing-pieces being each formed with a laterally-extending plate arranged to be secured directly to the inner face of one of the side bars of the said intermediate links, the bearing-pieces being also provided with elongated bearings for the connecting-pintles, such bearings extending out beyond the laterally-extending plate of the bearing-piece, and the said elongated bearings being so arranged as to abut end to end, whereby they serve to space apart the side bars of the links to which they are connected, substantially as set forth.

4. In a chain, the combination with the side bar of a link thereof, of a separate bearing-piece formed with a bearing for the pintle and having a supporting bracket or plate, and means for securing the said supporting-bracket directly to the side bar of the link, substantially as set forth.

5. In a chain, the combination of a link having its side bars of channel form, and a separate pintle-bearing secured to the said side bar between the flanges thereof, substantially as set forth.

6. In a chain, the combination of a link having side bars of channel form, a pintle-bearing consisting of a perforated block 4 arranged to lie between the flanges of the side bar, a bracket 7, and a stud 8 carried by the said bracket and arranged to be secured to the side bar of the link, substantially as set forth.

7. The combination of a chain having side bars formed of channel-shaped bars, the flanges of which are arranged to serve as wearing-shoes, substantially as set forth.

CHRISTOPHER W. LEVALLEY.

Witnesses:
 H. H. SARGENT.
 JOSEPH LOCH.